(12) United States Patent
Asplanato

(10) Patent No.: US 7,131,589 B2
(45) Date of Patent: Nov. 7, 2006

(54) DOCUMENT TRANSPORT APPARATUS AND METHOD FOR BARCODE READERS

(75) Inventor: Alejandro Asplanato, Citybell (AR)

(73) Assignee: Multiscan Corporation, Miami, FL (US)

( * ) Notice: Subject to any disclaimer, the term of this patent is extended or adjusted under 35 U.S.C. 154(b) by 144 days.

(21) Appl. No.: 10/386,153

(22) Filed: Mar. 11, 2003

(65) Prior Publication Data

US 2004/0178271 A1    Sep. 16, 2004

(51) Int. Cl.
    *G06K 7/10*    (2006.01)
(52) U.S. Cl. ............................. 235/462.14; 235/462.43
(58) Field of Classification Search ................ 235/475, 235/454, 462.05, 383–386, 444, 462.14, 235/462.25, 462.43, 477, 479, 481, 483–487; 27/3.1, 8.1, 256; 234/79
    See application file for complete search history.

(56) References Cited

U.S. PATENT DOCUMENTS

| | | | | |
|---|---|---|---|---|
| 3,163,758 A | * | 12/1964 | Treacy | 250/271 |
| 3,691,352 A | * | 9/1972 | Brinning | 235/474 |
| 3,745,312 A | * | 7/1973 | Ladine et al. | 235/475 |
| 4,479,194 A | * | 10/1984 | Fogg et al. | 235/386 |
| 4,889,240 A | * | 12/1989 | Sato et al. | 209/534 |
| 5,165,044 A | * | 11/1992 | Eschweiler et al. | 235/475 |
| 5,173,596 A | * | 12/1992 | Kapinos et al. | 235/475 |
| 5,448,049 A | * | 9/1995 | Shafer et al. | 235/462.05 |
| 5,653,439 A | * | 8/1997 | Rider et al. | 271/274 |
| 5,684,286 A | * | 11/1997 | Pierce | 235/454 |
| 5,730,533 A | * | 3/1998 | Noy et al. | 400/104 |
| 5,914,482 A | * | 6/1999 | Kocznar | 235/487 |
| 5,926,681 A | * | 7/1999 | Ishimaru | 399/367 |
| 6,182,896 B1 | * | 2/2001 | Momose | 235/449 |
| 6,308,886 B1 | * | 10/2001 | Benson et al. | 235/375 |
| 6,473,519 B1 | * | 10/2002 | Pidhirny et al. | 382/140 |
| 6,498,655 B1 | * | 12/2002 | Brooks et al. | 358/1.12 |
| 6,764,016 B1 | * | 7/2004 | Robertson et al. | 235/487 |

\* cited by examiner

*Primary Examiner*—Ahshik Kim
*Assistant Examiner*—Kumiko C. Koyama
(74) *Attorney, Agent, or Firm*—Robert C Kain, Jr.; Fleit Kain

(57) ABSTRACT

A barcode reader device for processing a plurality of documents having a transport system for transporting the documents along a travel path through a reading area; a blocking member; and a bearing member for pivotally suspending the blocking member along the travel path prior to the reading area, with the blocking member being disposed in spaced-apart relationship to the transport system so as to form an elongated, adjustable opening between the transport system and the blocking member for passing the documents one at a time.

47 Claims, 8 Drawing Sheets

DOCUMENT TRANSPORT APPARATUS AND METHOD FOR BARCODE READERS

BACKGROUND OF THE INVENTION

1. Field of the Invention

The present invention relates to an automatic barcode reader for documents.

2. Description of Related Art

Automated barcode reader devices are well known in the industry. These devices take the documents generally vertically stacked in a stacker and process them through a reading area one at a time. This reading area has at least one laser beam. The laser beam passes over and reads a series of printed bars forming a readable code or scan code. Based on a specific computer program, the readers can sort the data read from said bars according to one or more parameters determined by the program. They can also store the data or determine the route the item thus scanned has to follow to continue with its working proceedings. A number of these devices have document transport systems for processing documents through the reading area.

However, in most of these prior art devices, the documents scanned have a standard format of limited dimensions. Hence, the types of transport devices used with barcode readers are usually designed to process documents of similar characteristics, that is, dimensionally similar documents, such as a batch of invoices carrying a similar format or a batch of similar stubs. This limitation is due to the fact that the transport and sliding of documents are performed inside the transport machine through calibrated paths. The kinetic energy received by each individual document when being transported and the elements that make them go slower (friction, weight, etc.) need to be reasonably similar in these devices, since it is extremely important to ensure a steady speed of the document to be read in the reading area. Consequently, in the devices of the prior art the amount of movement given to each individual document generally should be similar for every document, since the mass is substantially similar in each document. With the processed documents being similar, the transport device manufacturer can thus ensure a predictable behavior for each document sliding or traveling inside their machines.

In the case of processing envelopes containing mail, this sliding and transporting task for the envelopes becomes difficult due to a number of reasons. First, the envelopes which have already been closed, with documents inside, are not usually evenly thick since there may be some differences within a certain range or format. Even when the envelopes are essentially equal in size and the location of the barcode to be read is in the same predetermined area, they may have one or more sheets of paper inside, thus resulting in the thicknesses of the envelopes varying. That is, some envelopes may contain only one sheet and others may contain two, three or more folded sheets. Consequently, their volume and mass vary. When this happens, both their thicknesses and their amount of movement will differ.

When the contents of the envelopes are similar, thickness variations are also essentially similar. This is crucial in the transport machines known in the prior art, since it is necessary to have an entrance opening to the reading area with a transversal section perpendicular to the document to be read, ensuring in this way the selection and transport of one document at a time. If two documents run together, one on top of the other, the document on the lower position is not read. However, it is usually the case that when there are uneven folds of paper or documents of different formats or clips in the envelope, there are also differences in thickness that obstruct the transport in the prior art transport machines. This is because all the existing transport machines have an entrance passage that restricts the thickness of the document, thus ensuring that only one document comes into the reading area at a time.

In summary, there are no transport devices or barcode readers for envelopes in the prior art that can read envelopes of different thicknesses, sizes or volumes within the same batch, at great speeds. Such prior art devices cannot ensure the transport of one envelope at a time through the reading beam when the envelopes differ in height or thickness depending on their contents.

If envelopes coming from different proceedings are sorted into batches of similar sizes, the different thicknesses of the envelopes may obstruct the normal functioning of traditional transport machines. Hence, it is desirable to have a new transport device to ensure that the envelopes come into the reading area of the laser beam one by one. These include envelopes of different acceptable sizes and thicknesses. Additionally, it is desirable to ensure that the output speed is greater than the input speed so as to avoid jams outside the reading area. This ensures a correct classification or selection of paths for the documents. This implies that the amount of movement to be given when leaving the reading area should be independent of the amount of movement initially given to the envelope. The amount of movement should be sufficient enough so as not to depend on the volume or mass of the envelope.

Hence, it is desirable to introduce new transport device which can read printed barcodes on envelopes that differ in height, size and thickness in the same batch. This new transport device should allow the transport of the envelopes one at a time at an acceptable speed, even when they are different in height, size or thicknesses, within a determined range. This new transport device should also permit their transport even when the different thicknesses and heights for a given envelope, e.g., thicker on one side than the other side of the same envelope.

OBJECTS OF THE INVENTION

It is an object of the present invention to provide an automatic barcode reader device for accepting and transporting, at acceptable speeds, envelopes of different sizes, with a range of thicknesses from 2 to 10 mm from one envelope to another in the same batch.

It is another object of the present invention device to provide an automatic barcode reader device for transporting envelopes that are uneven within the same batch.

It is also an object of the present invention-to provide an automatic barcode reader device with an output speed at the reading area that is greater than the input speed of the envelopes into this reading area.

Another object of present invention is to provide an automatic barcode reader device that can take one envelope at a time from a stack and process it through the reading area while avoiding two or more envelopes running one on top of the other, despite their different thicknesses.

Finally, another object of the present invention is to provide an automatic barcode reading device which accepts into the entrance of the reading area envelopes having different thicknesses along the transversal axis of the envelope with regard to their transport direction.

SUMMARY OF THE INVENTION

The invention is directed toward a barcode reader device for processing a plurality of documents, comprising transport means for transporting the documents along a travel path through a reading area; a blocking member; and bearing means, attached to the blocking member, for suspending the blocking member along the travel path prior to the reading area. The blocking member is disposed in spaced-apart relationship to the transport means so as to form an elongated opening between the transport means and the blocking member for passing the documents one at a time. The elongated opening is disposed in intersecting relationship with said travel path.

Consistent with the title of this section, the above summary is not intended to be an exhaustive discussion of all the features or embodiments of the present invention. A more complete, although not necessarily exhaustive, description of the features and embodiments of the invention is found in the section entitled "Detailed Description Of The Preferred Embodiments".

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8 is an enlarged detailed front view on scale of the blocking member while an envelope with different thicknesses is being transported.

Referring to the drawings in general, like reference numbers designate identical or corresponding parts throughout the several views.

DETAILED DESCRIPTION OF THE PREFERRED EMBODIMENT

Figure 1:
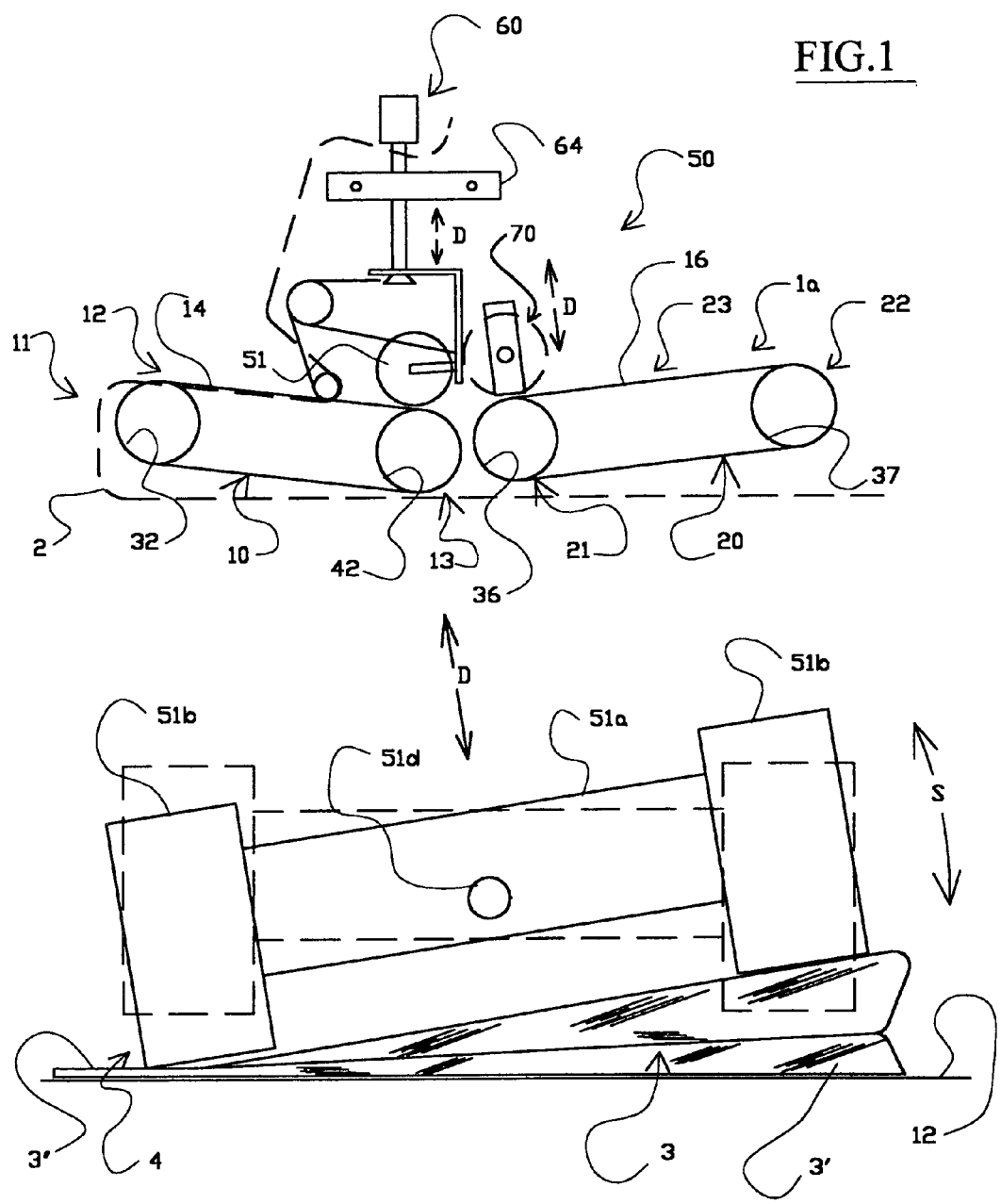
FIG. 1 is a simplified diagram of a side view of the barcode reader device in accordance to the present invention.

Referring to FIGS. 1 through 4, there is shown an automated barcode reading device 1A for reading bar codes on documents in accordance with the present invention. The reading device 1A includes a pair of opposed, lateral vertical sides 1 and 2. The reading device 1 A further includes a document transport system ("transport means") having a first transport assembly 10 and a second transport assembly 20, both of which are used as conveyors for transporting the documents along a travel path in a manner and for a purpose to be described hereinafter. Documents, such as letters, may be fed individually, or they can be stacked on a conventional document stacker (not illustrated) and fed to the first transport assembly 10. In the case of the document stacker, it would be placed next to an edge 11 of the first transport assembly 10. In either case, the documents enter the document transport system at the edge 11 of the first transport assembly. With respect to the travel path, the first transport assembly 10 can be viewed being upstream and the second transport assembly 20 can be viewed as being downstream.

An upper, oblique horizontal surface 12 of the first transport assembly 10 defines a first part of the travel path, with the documents traveling from the edge 11 to an opposite edge 13 of the first transport assembly 10. The first transport assembly 10 is downwardly inclined. More specifically, the opposite edge 13 is at a lower level with respect to the first edge 11. The second transport assembly 20 has a first edge 21 positioned next to the second edge 13 of the first transport assembly 10. The second transport assembly 20 has an upper, oblique horizontal surface 23, which defines a second part of the travel path. The second transport assembly 20, and therefore surface 23, is slightly upwardly inclined. More specifically, a second edge 22 of the second transport assembly 20 is at a higher level than its first edge 21. The second edge 13 of the first transport assembly 20 is essentially at the same level of the first edge 21 of the second transport assembly. Both transport assemblies 10 and 20 establish the passage of the document inside the device 1A.

Figure 4:
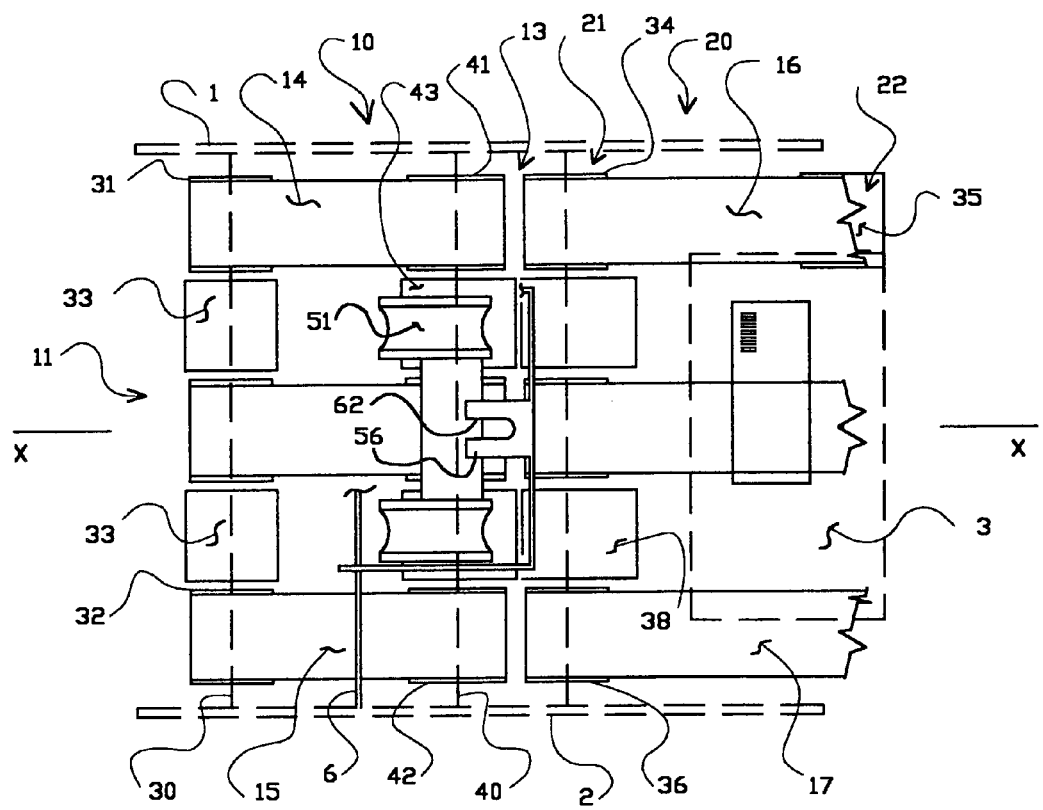
FIG. 4 is a top view of a portion of the barcode reader device in accordance to the present invention.

In FIG. 4, the top of the two transport assemblies 10 and 20 are visible. The components of these assemblies 10 and 20 are now described in detail with respect to FIG. 4. The previously discussed travel path of the documents is parallel with the symmetric longitudinal axis x-x and this axis will be used as a reference in this discussion. The first transport assembly 10 includes a pair of shafts 30 and 40, both of which are perpendicular to the symmetric longitudinal axis x-x of the reader device 1A. The shaft 30 is positioned next to the first edge 11 of the first transport assembly 10 and the second shaft 40 is positioned next to the second edge 13 of the first transport assembly 10, with shafts 30 and 40 being disposed in parallel relationship. There are at least two wheels 31 and 32 rotatably mounted on the first shaft 30 and at least two wheels 41 and 42 rotatably mounted on the second shaft 40. The pair of wheels 31 and 41 and the other pair of wheels 32 and 42 are aligned according to a line parallel to axis x-x. On the first pair of wheels 31 and 41 there is a first belt 14 and on the second pair of wheels 32 and 42 there is second belt 15. Preferably, there are additional wheels 33 and 43 positioned midway between the belts. In this manner, the upper surface of the first transport assembly 10 is determined by the upper sections of belts on which a document is transported. Generally, it is desirable to have a greater number of belts, with the illustrative example in FIG. 4 showing three belts. However, one skilled in the art will recognize that the number of belts used can be varied.

For example, if the transport assembly (10) were made up of only two parallel belts 14 and 15, on the shaft 30, the wheels 31 and 32 would be only separated by a single third wheel 33. On the other hand, FIG. 4 shows an example with three belts, so with respect to the shaft 30, the belts are separated by two wheels 33 and, with respect to the shaft 40, the belts are separated by two wheels 43. Belts could be positioned over all five pairs on wheels.

The transport assembly surfaces 12 and 23 may be constructed using a flat rigid plate (not shown) with the corresponding openings, or they may also have virtual plates. In the case of a flat rigid plate, the plate has openings for the wheels. In the case of virtual plates, enough belts are used with close enough spacing that no plate is needed. In other words, the upper side of the transport assembly 10 may also be defined by the rigid plate with openings formed in the plate. These openings will allow wheels 33 and 43 to emerge. These wheels are slightly secant to the transport assembly 10 so that the belts 14, . . . 15 remain parallel to it. It is evident that the separation between the belts 14 and 15 is much narrower than the dimensions of the envelope that runs over them so as to have a good base. In the case of using flat rigid plates (not shown) for parts of the surfaces 12 and 23, they may be constructed by using a flat metal sheet with regular longitudinal openings through which the transport belts may emerge parallel to the flat metal sheet. Since the transporting of the documents is actually performed by the belts, the presence of these flat metal sheets with openings important to the present invention, other than such surfaces prevent foreign bodies from entering into the device 1A, such as paper clips and pieces of paper. Moreover, as already mentioned, the transport surfaces can be "virtual" in the sense that a sufficient number of belts may be placed side by side to give continuity to the surfaces 12 and 23. But for either or both of these reasons, such flat rigid plates are not shown, thereby making the components of the invention visible in the various Figures. At the second edge 22 of the second transport assembly 20, there is an area (not shown) to receive the documents that have been transported through the device with receptive ordinary means.

The shafts 30 and 40 are fixed to the sides 1 and 2, which form part of the housing or structure of the reader device 1A. At least one of shafts 30 or 40 is connected to a motor, ideally an electric motor (not shown). In the preferred embodiment, the electric motor is coupled to the second shaft 40. This motor makes both the shaft and wheels 41, . . . 42 rotate at the same time. It moves belts 14, . . . 15 at the same speed since wheels 41, . . . 42 have the same diameter. As it was already explained, there may be two or more belts in each section of the transport assemblies 10 and 20, as represented by the dotted lines across the reference numbers mentioned before.

The same discussion provided above in describing the first transport assembly 10 is applicable for describing the second transport assembly 20 and will be repeated in only limited detail herein. With respect to the axis x-x, it is not compulsory for the belts and wheels in the transport assembly 20 to be aligned with the components of the transport assembly 10, even when it is obviously convenient for the preferred implementation. Sudden changes in the direction of envelope 3 are avoided by this alignment. Transport assembly 20 consists of wheels 34 and 35 on which there is a belt 16, and at least a second pair of wheels 36 and 37 with another belt 17. Both pairs of wheels are separated by wheels 38. They are mounted on shafts that are fixed to plates 1 and 2, similarly to those in the transport assembly 10. The wheels are moved by a motor. The same motor may be used for both the first and second transport assemblies 10 and 20. Alternatively, two independent electrical motors may be used. In either case, it is crucial that the belts in the second transport assembly 20 are faster than the belts in the transport assembly 10.

With reference to FIG. 4, an envelope 3, with an illustrative bar code, is shown in its reading area or position, which means that it has already progressed down the travel path in accordance with the present invention, which will be described hereinafter. The process of reading the envelope is not part of the present invention, but will briefly be described. Generally, one or more lasers are used to scan the envelope 3 while located in its predetermined reading position. Typically, a great quantity of envelopes, one at a time, go through a laser beam at relatively high speeds. The envelopes 3 should have a barcode in a visible position. This device can thus classify the barcode based on a variety of parameters read from said barcode and at the same time it can accumulate and/or transmit the information thus collected to a computer for data storage. For example, this reading device 1A may be applied to classify and order mail, either sent by a publisher or a company. For example, the reading device 1A may be used by a utility company, which has to send a great quantity of invoices to its customers and has to classify them according to areas or streets, or used by a mailing service which has to quickly classify and distribute its mail.

Figure 2:
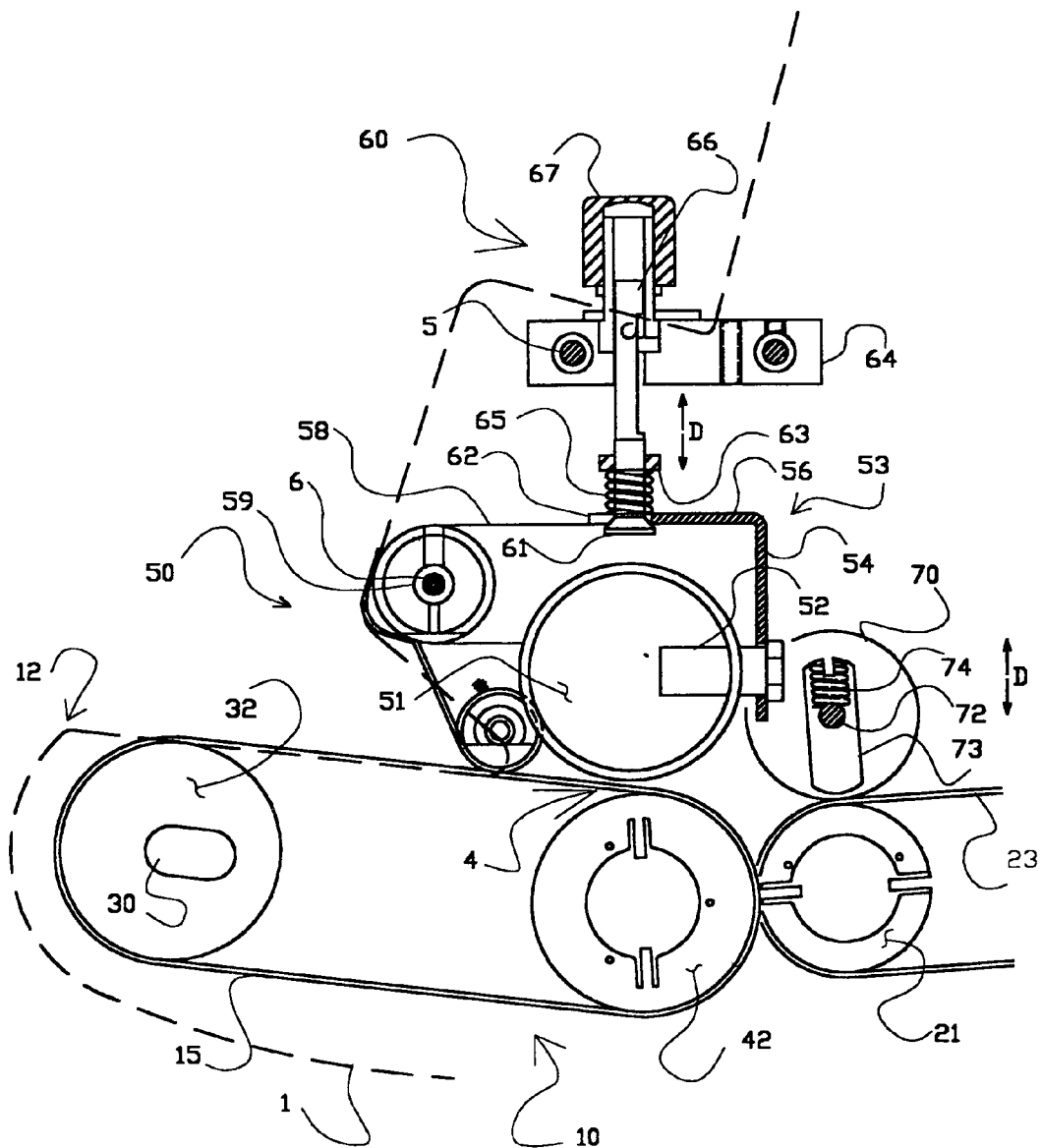
FIG. 2 is an enlarged detailed view of a portion of FIG. 1.

With reference to FIG. 2, a lateral elevation of the reader device 1A is shown partially in a cross section in relation to the first transport assembly 10. A stopping mechanism or means, generally referred to by reference numeral 50, is shown in FIG. 2. The stopping mechanism regulates the feeding of one document at a time into the reading area. A regulating mechanism or means, generally referred to by reference numeral 60, regulates the height of the stopping mechanism 50, which in turn regulates the admission opening height 4, that is, the mechanism 60 regulates the thickness of the envelope 3 admitted into the reading area. The stop mechanism 50 and regulator mechanism 60 are described in detail hereinafter.

Figure 3:
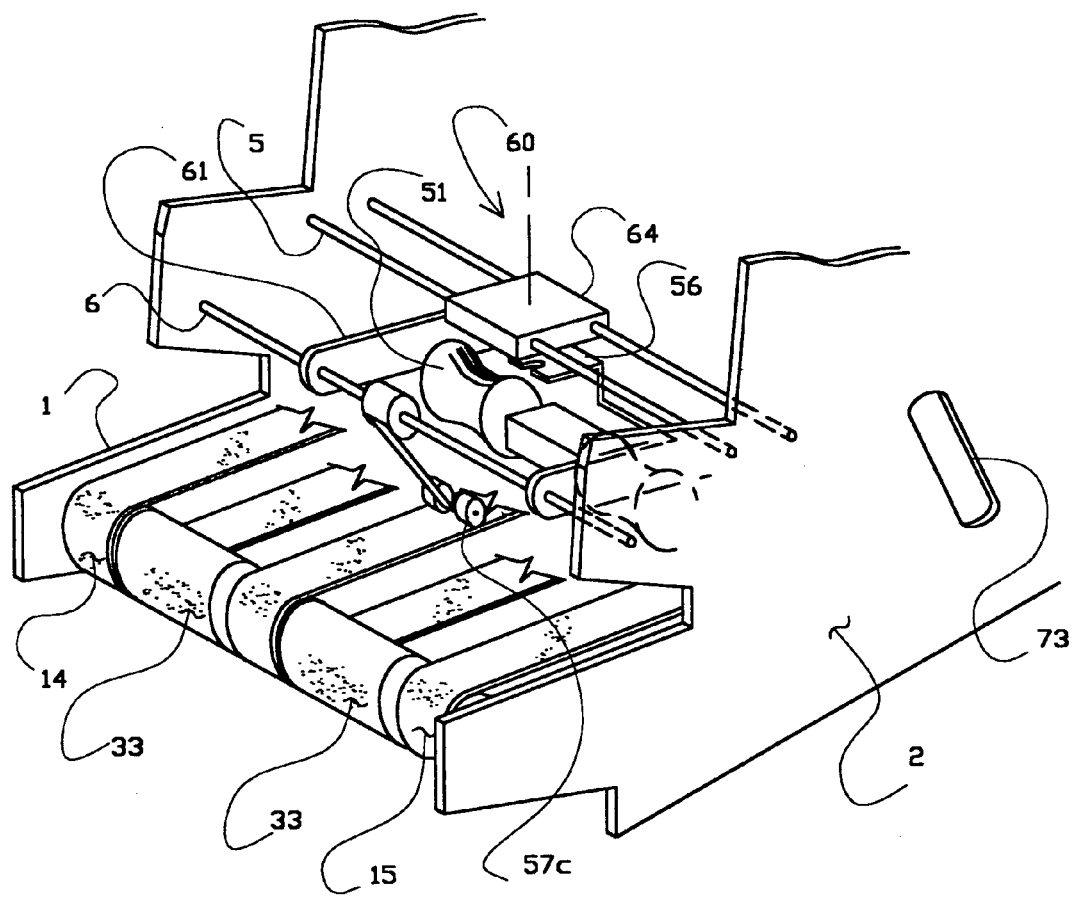
FIG. 3 is an upper perspective view of a portion of the barcode reader device in accordance to the present invention.
Figure 5:
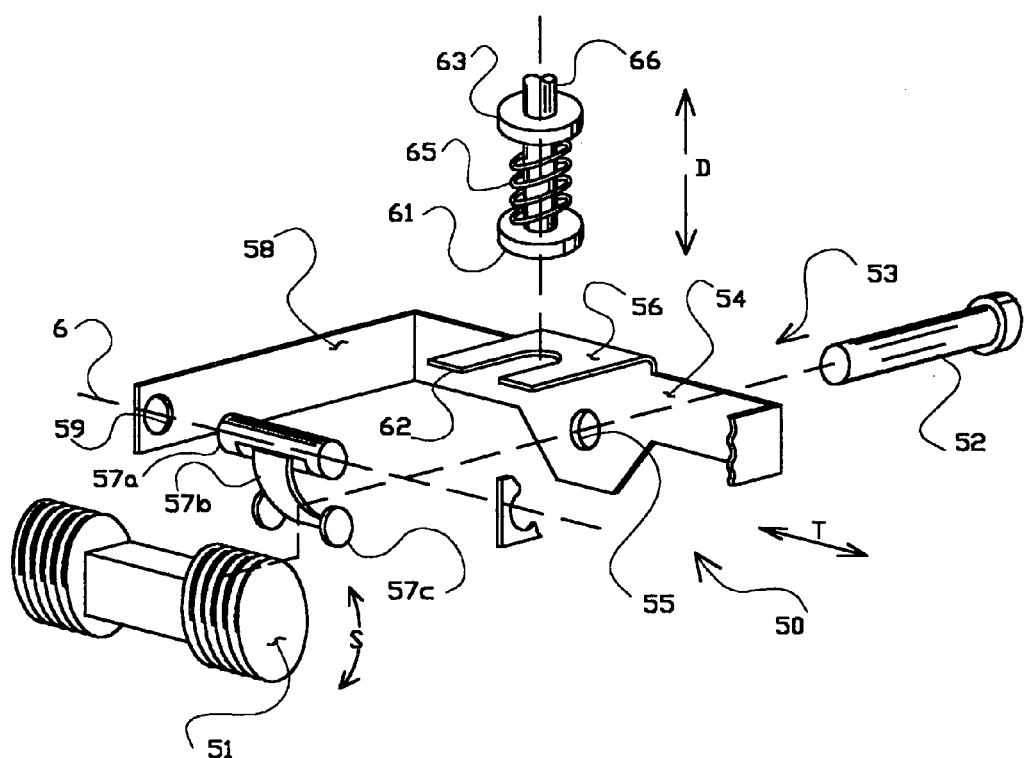
FIG. 5 is a detailed exploded perspective view of the bearing member and blocking member of the barcode reader device in accordance with the present invention.

With reference to FIGS. 2, 3 and 5, the stopping mechanism 50 includes a blocking member 51 and a bearing member 53 ("bearing means") for suspending the blocking member 51. The blocking member 51 is suspended over the upper surface 12 of the first transport assembly 10. The longitudinal axis of the blocking member 51 is perpendicular to the longitudinal axis of the transport assembly. Both the blocking member 51 and the surface 12 of the first transport assembly 10 define the horizontal opening 4 through which a single envelope can pass. The blocking member 51 preferably is cylindrical, although one skilled in the art will recognize that many other shapes and configurations are possible. For example, the blocking member 51 may be prismatic with a straight horizontal axis and oblique faces that converge to form the opening 4, or it may have a transversal elliptical section. Ideally, the blocking member 51 should have a cylindrical shape. However, as it has been already explained, it is possible to have other shapes compatible with the stopping function that allows stopping all the documents except one.

In operation, one possibility is that the documents (envelopes referred with 3 in the preferred application) are stacked in a conventional stacker (not shown). In this case, they are taken one at a time by the transmission belts in transport assembly 10. When reaching the blocking member 51, only the lower envelope, which is in contact with the transmission belts (see FIGS. 3 and 4), continues along the travel path toward the reading area. The rest of the envelopes are thus stopped by the blocking member 51 until the lower envelope, immediately below the previous one, comes in contact with the transmission belts.

The bearing member 53, which suspends the blocking member 51, is best illustrated in FIGS. 2, 3, and 5. The bearing member 53 includes a rocking arm having a bolt 52, a back wall 54, a fold 56, and a pair of arms 58. An important aspect of the present invention is that the blocking member 51 is rotatably suspended in its middle, such as is accomplished with the bolt 52, so that it is able to oscillate in a plane perpendicularly disposed to the surface 12 of the first transport assembly 10, thus modifying the opening 4 through which the envelopes pass. More specifically, the back wall 54 has formed therein an opening 55 through which the bolt 52 extends so as to secure the blocking member 51 for oscillating movement about the bolt 52. It should be appreciated that many different components can perform the function of the bolt 52, such as a pin, bolt, screw or the like. This oscillating movement is referred to as "S" in FIG. 5 and FIG. 8.

Referring to FIG. 8, one important aspect of the present invention is that the blocking member 51 may define an opening for different heights based on the different envelope heights or thicknesses that will go through the opening 4. In operation, the blocking member 51 pivots around an aperture 51d for receiving the bolt 52 of FIG 5. A broken line indicates the resting position of the blocking member 51. FIG. 8 also illustrates how the blocking member 51 of the present invention handles an illustrative envelope 3, which is shown as having a flat part 3" and a bulky part 3'. This type of envelope is typically incurred when the envelope contains more than one stapled sheet. This kind of envelope cannot be read in the known devices in the prior art because it cannot go through the opening entrance of the prior art devices. However, in this invention, the blocking member 51 pivots round the aperture 51d as shown by the "S" arrows. Hence, the entrance opening 4 changes depending on the transversal document geometry.

Figure 9:
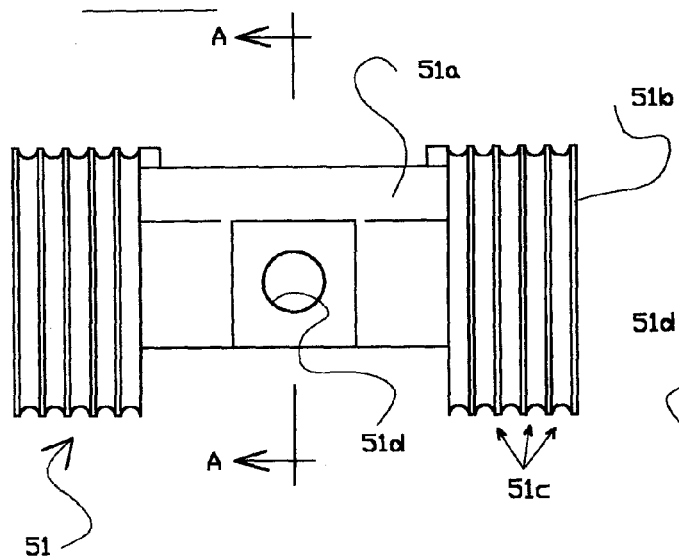
FIG. 9 is a rear view of the blocking member in accordance with the present invention.
Figure 10:
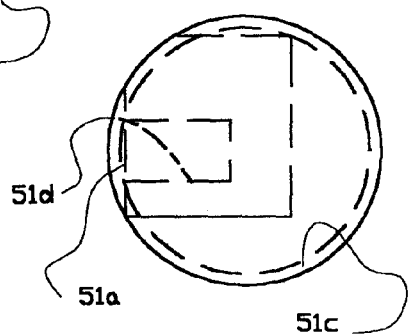
FIG. 10 is a cross-sectional view of the blocking member taken along section line A—A of FIG. 9.
Figure 11:
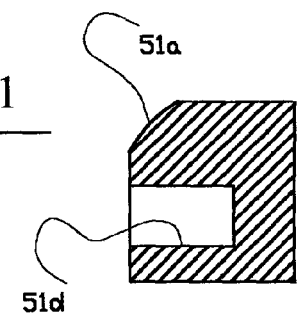
FIG. 11 is a cross-sectional segment view taken with respect to the dashed lines in FIG. 10.

Referring to FIG. 8, the blocking member 51 is shown with a center bar 51a and a pair of opposed end portions 51b mounted to the center bar 51a. The aperture 51d is formed in the center bar 51a in its rear part in order to receive the bolt 52 of FIG. 5. A detailed view of the aperture 51d in a center bar portion 51a of the oscilating member 51 is shown in FIG. 11. As shown in FIG. 9, ideally, the blocking member 51 also should have essentially rounded cylindrical extremes. It is clearly seen here that each extreme has several grooves 51c.

In addition to the above describe oscillating motion, the bearing member 53 can move laterally in "T" directions, as shown in FIG. 5. This lateral movement is possible due to the inclusion of shaft 6, which, for example, is secured at its ends to lateral sides 1 and 2. The arm like extensions 58 of the bearing means 53 slidably rest on the shaft 6 by having the shaft 6 positioned through a pair of holes 59 formed in the extensions 58.

As previously mentioned, the reader device 1A of the present invention further includes a height adjustment mechanism or means 60 for regulating the height of the bearing member 53, and therefore, the height of the blocking member 51. Regulating the height of the bearing member 53 in turn causes the blocking member 51 to ascend or descend. The ascent or descent of the blocking member 51 increases or decreases, respectively, the height of the opening 4 which provides the admission slot for the documents to the reading area. Referring to FIGS. 5 and 8, from the middle of the back wall 54, the fold 56 projects outward in perpendicular relationship to the back wall 54. The fold 56 has a seat used in the adjustment that regulates the height of the bearing member 53, as will be described hereinafter. This height adjustment is shown as "D" in FIGS. 2 and 5.

Referring to FIGS. 2, 5, 6 and 7, the height adjustment mechanism 60 includes a shaft which has a lower enlarged end portion 61 that fits under a cut-out 62 formed in the fold 56. Above the fold 56, this shaft has a circular, intermediately positioned protrusion 63 defining a shoulder with a spring 65 mounted between the fold 56 and the circular protrusion 63. This permits an axial movement in a "D" direction of the bearing member 53. This shaft is mounted on a block 64 which fixes it in space. As best shown in FIG. 3, this block 64 may be moved along a pair of guides or shafts 5. These guides 5 go through the openings 69 (see FIG. 7) in the block 64, with the guides 5 being securely attached to the laterals sides 1 and 2 of the housing for the reader device. The adjustment mechanism 60 is mounted on these guides 5 and is moved together with the pieces of the stopping mechanism 50. This lateral movement is important because it is what allows the adjustment of this device function for batches of envelopes with different geometry.

Figure 7:
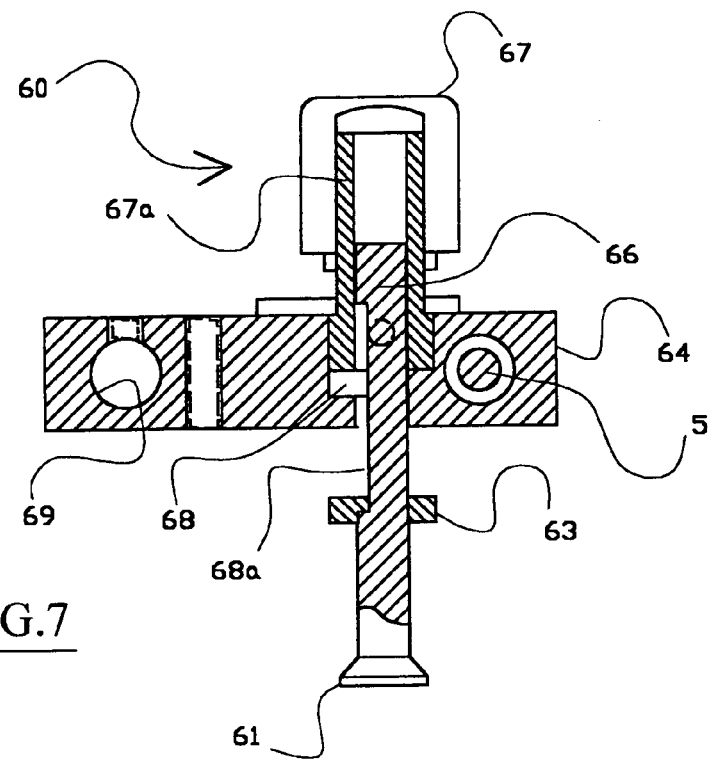
FIG. 7 is a lateral, cross-sectional view of the height adjustment mechanism in accordance with the present invention.
Figure 6:
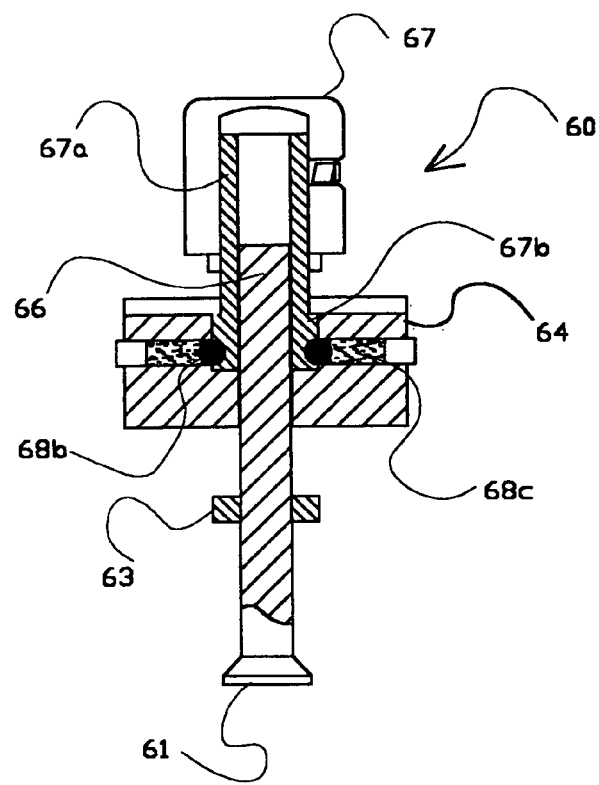
FIG. 6 is a front, cross-sectional view of a height adjustment mechanism in accordance with the present invention.

Referring to FIGS. 6 and 7, the shaft of the height adjustment member 60 has an upper threaded stem 66 that rests and rotates within in the block 64. It is possible to adjust the height of the bearing member 51 (and a fixing means 68) through an adjustment device. This adjustment device includes a knob 67 with a threaded interior, which engages a threaded exterior of the threaded stem 66. This threaded stem 66 forms part of the shaft, which also includes the protrusion 63 and the enlarged portion 61. The knob 67 is adjacent to an internal coaxial bushing 67b that rotates when the knob 67 rotates. In this manner, the threaded stem 66 is axially slid relative to the bushing 67b, thus varying the height of the blocking member 51. Inside the block 64, a pair of balls 68b are pressed by a spring 68c against a seat in a collar 67b producing, in this way, a variety of fixed positions. This allows the angular position adjustment of parts 67–67a. As it has been explained, the axial position of the stem 66 of the shaft makes the wide, flat, enlarged end portion 61 of the shaft ascend or descend. This movement is indicated by "D" in the figures. This movement increases or decreases the admission opening height 4 when the bearing member 53 for the blocking member 51 ascends or descends. FIGS. 6 and 7 show a preferred construction of said height adjustment member 60. However, there are other possible designs available for the height adjustment member 60.

Summarizing the height adjustment means 60, the knob 67 and its attached bushing 67b threadingly engage a threaded stem 66 of the shaft, so that rotation of the knob 67 in one direction will raise the shaft and therefore raise the bearing member 53 and rotation of the knob 67 in the other direction will lower the shaft and therefore lower the bearing member 53. It should be noted that the enlarged end portion 61, which suspends the bearing member 53 and therefore the blocking member 51, prevents the blocking member 51 from being any lower. Hence, this defines a transversal opening 4 for the admission of documents to have a set height. However, with this set minimum height, the spring 68c provides a biasing means that allows the set minimum height of the opening to be increased under upward directed pressure, based upon the spring compression that allow upward movement of the bearing member 51, as shown by the height adjustment of "D" in FIGS. 2 and 5. Of course, by further rotation of the knob 67, the minimum set height of the opening 4 may be varied to be larger or smaller, as desired. It should be noted that this minimum set height for the opening 4 is fixed only with respect to the center of the blocking member 51, due to the capacity of the blocking member 51 to rotate around its pivotal axis (previously referred to oscillating motion), as shown in FIG. 8. More specifically, regardless of the height of the center aperture 51d of the blocking member 51, the blocking member 51 can rotate (when forced by an envelope, for example) until one of its ends 51b engages the surface of the first transport assembly 10. But when the blocking member 51 is at rest (no document passing thereunder), adjustments by the knob 67 uniformly increase or decrease the opening 4 across its entire transversal dimensions, since the member 51 is balanced about its pivotal axis mounting when at rest. As shown in FIG. 8, the opening is elongated and substantially perpendicular to the travel path of the documents.

Referring to FIG. 1, next to the reading or scan area, the barcode reader device 1A has at least one roller 70. This roller 70 is positioned above the rear parts of the second transmission belts 16 and 17. Referring to FIG. 2, the roller 70 is mounted on a shaft 72. Although only one roller is shown, a plurality of rollers 70 may be rotatably mounted on the shaft 72. The roller 70 and shaft 72 both move perpendicularly to the belts. As shown in FIGS. 2 and 3, one of the possible implementations for this part of the device may include a vertical opening 73 in the sides 1 and 2. Referring to FIG. 2, each opening 73 has compression springs 74 that press the shaft 72 in the direction of surface 23 of the transmission belts 16, . . . 17. A good traction on the envelope 3 is thus produced outside the reading area. This traction is able to compensate and accompany the blocking member 51 in case the envelope read is uneven. It is important for the present invention that the transmission belts 16 and 17 of the second transport assembly turn faster than the belts 14 and 15 of the first transport assembly, thus ensuring a correct evaluation of the document read.

One of the possible constructions of the stopping mechanism 50 of FIG. 2 is to include a lower envelope selector for feeding of one document at a time into the entrance opening 4. A first embodiment of this lower envelope selector includes a guide roller 57c (see FIGS. 2,3 and 5) preceding blocking member 51. This roller 57c presses the envelope 3 by means of a metal band 57b. This metal band 57b is mounted to the shaft 6, for example, since it is fixed to a cylindrical member 57a, which is supported by an arm 58 of the rocker arm shown in FIG. 5. With this location, it is possible to adjust both the metal band flexion and the roller pressure on the document. The benefit of using this roller 57c is that it works as a first stopping component. It stops all the envelopes except the lower one, which is carried by the belts of the first plate into the opening entrance 4.

Figure 12A:
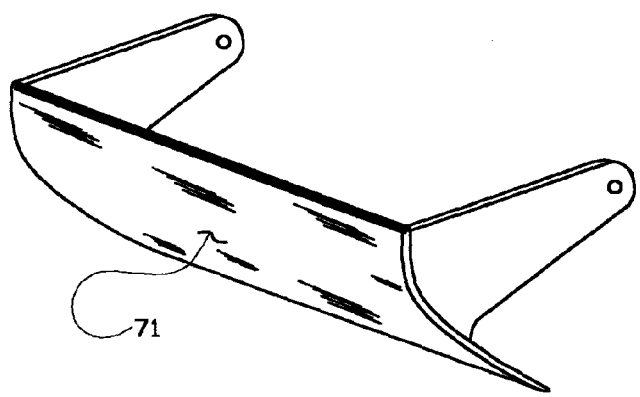
FIG. 12a is a perspective view of an alternative embodiment of a lower envelope selector shown in FIG. 12.
Figure 12:
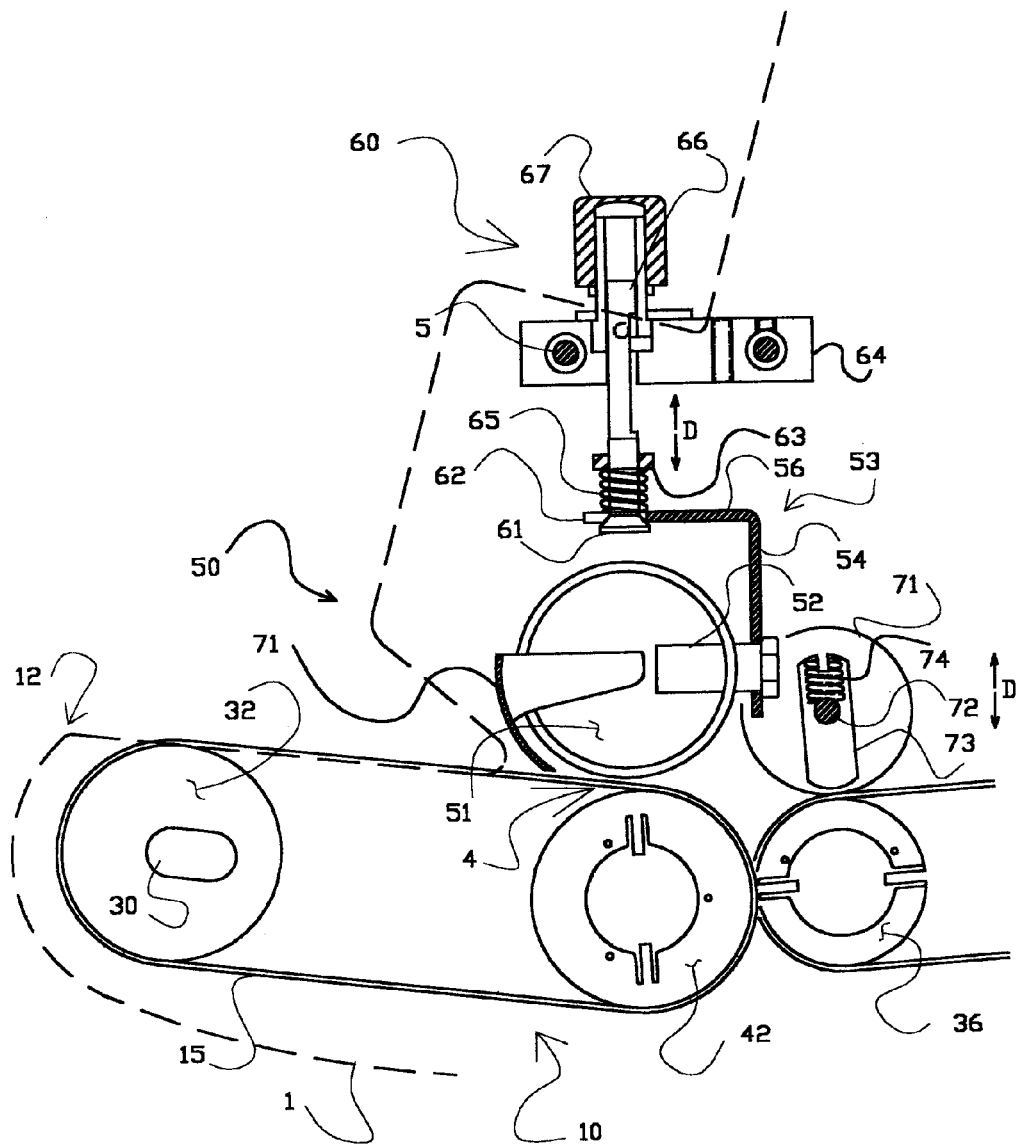
FIG. 12 is a side, partial cross sectional view of an alternative embodiment of the barcode reader device in accordance with the present invention.

In FIGS. 12 and 12a illustrate an alternative embodiment of the lower envelope selector for the stopping mechanism 50. It consists of a flexible curved plate 71, which is tangent to the upper surface 12 of the first transport assembly 10. Each document 3, when carried by the belts, moves this plate 71 upwards, while the rest of the envelopes are retained by the curved surface of 71. It is important to observe that in both embodiments of the lower envelope selector, the envelopes move in contact with either metal band surface (57b) or the curved plate (71) in order to lighten the weight of the stacked documents pressing on the lower document of this same stack.

A summary of the barcode reader device 1A of the present invention, along with the system in which it is included, will be provided with respect to FIG. 1. The reader device includes the transport system (transport assemblies 10 and 20) for transporting documents within a travel path through a reading area. The longitudinal axis of the surface 12 of the assembly 10 and the surface 23 of the transport assembly 20 generally are coincident with or parallel to the travel path of the documents through the reader device 1A. This reading area is swept by at least one conventional laser beam (not shown), either completely or in part. This laser beam is able to read a barcode on the document. Typically, but not necessarily, the barcode reader device 1A includes a conventional stacker (not shown) for stacked documents to be read. This device 1A also has stopping mechanism 50 of the present invention for taking one document at a time to introduce it into the reading area. Conventional output means (not shown) is provided for receiving the documents after scanning, which is positioned next to the reading area. The stopping mechanism 50 also has means to stop the documents near the reading area entrance, thereby allowing for the passage of only one document at a time. The document transport system is characterized by the travel path that includes at least a first oblique horizontal surface 12 of the first transport assembly 10 with one edge joined to a document stacker (not shown) while the opposite edge goes downstream. Adjacent to the second edge of the surface 12 is the first edge of a second oblique horizontal surface 23 of the second transport assembly 20 which goes upstream. The second edge of the surface 23 is higher than its first edge, and the second edge of the first surface 12 is essentially at the same level of the first edge in the second surface 23. Next to each of the first and second edges of each of the downstream and upstream surfaces 12 and 23, there is a shaft with several rollers. This shaft is perpendicular to the longitudinal axis of the surfaces 12 and 23 and the travel path. The rollers at one end of the surfaces 12 and 23 are parallel and aligned with those in the other end according to the longitudinal axis of symmetry in the surface. In at least two pairs of rollers there is a belt joining each pair. The rollers are aligned and placed at the ends of the same plate. The upper sides of this belt are parallel to the upper side of the corresponding plate. The belts are moved by at least one motor means, thus defining the sliding and the movement of the documents. The stopping mechanism 50 for stopping the documents is placed above the belts of the first surface 12 and between the two shafts corresponding to the transport assembly of the surface. The stopping mechanism 50 includes a blocking member 51, which is perpendicular to the longitudinal axis of the surface 12 and it is suspended from its middle part. This blocking member 51 oscillates perpendicularly to the first mentioned surface 12 so as to establish a separation between the lower part of the blocking member and the upper surface 12 of the first transport assembly. It thus defines the stopping means and the selection of the passage for each individual document into the reading area. The bearing member 53 suspends the blocking member 51. A height adjustment mechanism 60 is provided to adjust the height of the blocking member in relation to the first surface 12. The bearing member also includes lateral movement means for adjusting the transversal position of the blocking member 51 in relation to the median (longitudinal axis) of the surface 12.

Referring to the FIGS. in general, the above described structures of present invention allow for many forms of movement for the blocking member 51, each of which assists in the passage of the documents one at a time to the reading area. The pivotal mounting of the blocking member 51 at its middle allows for the blocking member 51 to become an oscillating member, i.e., limited rotation about its pivotal axis as shown by the "S" in FIGS. 5 and 8. The pivotal axis of the blocking member 51 is substantially parallel to the travel path of the documents. However, since the bearing member 53 can be rotated about its own pivotal axis to a very limited degree, the pivotal axis of the blocking member 51 may not be exactly parallel to the travel path, but it can be said that the pivotal axis of the blocking member 51 is parallel to a vertical plane traversing the travel path (or the longitudinal axis of the transport assemblies 10 and 20). This oscillating motion allows for the passage of documents having a non-uniform cross-section relative to the opening 4. As previously mentioned, the bearing member 53 suspends the blocking member 51 above the surface 12 so as to define an opening 4, which traverses the travel path and has a pre-set height below the middle of the blocking member 51. It should be recognized that the heights of the opening may vary elsewhere than its middle based upon the oscillating movement during the passage of documents. Hence, when referring to the adjustment of the height of the blocking member 51, it will be the height of the blocking member at its middle relative to the first transport assembly 10. Of course, when the blocking member 51 is at rest, it is level and balanced about its pivotal axis in its middle.

Two additional forms of movement provided by the present invention may modify the above-described preset height of the opening 4, one prior to operation and the other during operation. First, prior to operation the adjustment means 60 allows for the raising and lowering of the bearing member 53, thereby correspondingly changing the preset height of the opening 4 at its middle. With the adjustment means 60 fixed so as to provide a pre-set height for the opening 4, further downward movement of the middle of the blocking member 51 is not possible based upon the bearing member 53 resting upon enlarged portion 61 of the shaft (rocking arm cannot further rotate downward). However, during operation, bias means is provided in the way of spring 65, that allows the rocker arm of the bearing member 53 to rotate upward (shown by "D" in FIG. 5) with pressure from documents passing under the blocking member 51, so as to increase the height of the opening 4, even though temporarily.

Additionally, the blocking member 51 is capable of lateral movement relative to the travel path, as shown by the "T" in FIG. 5, which allows for the adjustment of the device function for batches of envelopes with different geometry.

It should be noted that the rocking arm of the bearing member 53 pivots around a pivotal axis that is essentially parallel to to the longitudinal axis of the block member 51 and is in a vertical plane that is perpendicular to the longitudinal axis of the transport assembly 10 and the travel path. Further downward motion of the rocking arm is prevented by the enlarged end 61 of the shaft of the height adjustment mechanism 60, but that this can be adjusted. A biasing force is applied against upward rotation of the rocking arm.

The invention has been described in detail with particular reference to preferred embodiments thereof, but it will be understood that variations and modifications can be effected within the spirit and scope of invention.

What is claimed is:

1. A barcode or scan reader device for processing a plurality of documents, comprising:

transport means for transporting said documents along a travel path through a reading area;

a blocking member;

bearing means, attached to said blocking member, for pivotally suspending and vertically movably suspending said blocking member along said travel path prior to said reading area; and said blocking member being disposed in spaced-apart relationship to said transport means so as to form an elongated opening between said transport means and said blocking member for passing said documents one at a time, said elongated opening being disposed in intersecting relationship with said travel path;

wherein said blocking member has an elongated configuration traversing said travel path and said blocking member is rotatably suspended about its middle on a pivotal axis with said pivotal axis being disposed in the middle of said elongated configuration, said bearing means being pivotally attached to said blocking member at said pivotal axis; and, sliding means for slidingly mounting said bearing member for lateral movement relative to said travel path.

2. The reader device according to claim 1, wherein said bearing means includes a rocking arm for pivotally suspending said blocking member, whereby movement of said documents along said travel path past said blocking member may be facilitated by oscillating motion of said blocking member.

3. The reader device according to claim 2, wherein said blocking member is balanced about said pivotal axis when at rest.

4. The reader device according to claim 3, wherein said blocking member has a cylindrical bottom at least at its opposed ends.

5. The reader device according to claim 2 wherein said blocking member is disposed in balanced relationship about said pivotal axis, whereby the ends of said blocking member are equally spaced-apart from said transport means when at rest.

6. The reader device according to claim 5, wherein said blocking member has a pair of opposed end portions, each said end portion having a cylindrical shaped bottom with a plurality of grooves formed therein.

7. The reader device according to claim 5, wherein said transport means has a substantially flat surface positioned under said blocking member.

8. The reader device according to claim 7, further comprising a pair of opposed lateral sides, a shaft extending between said lateral sides, said rocking arm being pivotally and vertically movably mounted on said shaft.

9. The reader device according to claim 2, wherein said rocking arm being pivotally mounted at one end about a horizontally disposed pivotal axis in a vertical plane which is substantially perpendicular to the travel path and being attached to said blocking member at the other end.

10. The reader device according to claim 9, wherein said rocking arm has a first portion disposed in a first plane substantially passing through said pivotal axis of said rocking arm, a back wall portion disposed in a downward facing second plane that is substantially perpendicular to said first plane, and said protrusion that extends orthogonally outward from said back wall portion; said blocking member being pivotally attached to said protrusion.

11. The reader device according to claim 10, further including a pair of opposed lateral sides and a shaft extending between said lateral sides; and wherein said rocking arm is pivotally and vertically movably mounted on said shaft.

12. The reader device according to claim 10, further including stop means, said stop means having a fold extending out from said back wall of said rocking arm and a shaft securely mounted at one end to prevent vertical movement of said shaft and having an enlarged end portion at the other end, said enlarged end portion of said shaft being positioned under said fold to prevent downward rotation of said rocking arm past a certain point.

13. The reader device according to claim 12, further including biasing means, said biasing means having said shaft with an intermediately positioned extension and a spring positioned between said fold and said extension, whereby said spring biases against upward rotation of said rocking arm.

14. The reader device according to claim 13, further including stop adjustment means having a block securely mounted to prevent vertical movement of said block and a rotating means, mounted in said block, for changing the vertical height of said shaft relative to said block, whereby said lowering or raising of said shaft correspondingly lowers or raises said certain point.

15. The reader device according to claim 14, further including a pair of lateral sides; a first guide, a second guide, and a third guide each extending between said lateral sides; said block being slidingly mounted on said first guide and second guide; said first portion of said rocking arm comprises a pair of arms and said arms at the ends remote to said back wall portion being pivotally mounted on said third guide; whereby said blocking member, said bearing means and said height adjustment means slide laterally.

16. The reader device according to claim 9, wherein said first portion of said rocking arm comprises a pair of arms, each said arm at the end remote to said back wall portion having said pivotal mounting.

17. The reader device according to claim 9, further including height adjustment means for rotating said rocking arm about said pivotal axis of said rocking arm to adjust the height of said opening.

18. The reader device according to claim 9, wherein said bearing means for pivotally and vertically movably suspending includes biasing means for biasing against upward rotation of said rocking arm about said pivotal axis of said rocking arm.

19. The reader device according to claim 9, further including height adjustment means having biasing means to bias against rotation upward of said rocking arm about said pivotal axis of said rocking arm; stop means to prevent downward rotation of said rocking arm around said pivotal axis of said rocking arm past a certain point, and stop adjustment means for adjusting said certain point.

20. The reader device according to claim 2, wherein said transport means includes a first transport assembly and a second transport assembly, each said transport assembly having at least two belts operable to rotate in the direction of said travel path with the speed of said belts of said second transport assembly being greater than the speed of said belts of said first transport assembly; said blocking member being positioned over said first transport assembly; and said reading area being positioned on said second transport assembly.

21. The reader device according to claim 1, wherein said bearing means includes a rocking arm, said rocking arm being pivotally mounted at one end about a horizontally disposed pivotal axis in a vertical plane which is substantially perpendicular to the travel path and being attached to said blocking member at the other end.

22. The reader device according to claim 21, further including height adjustment means for rotating said rocking arm about said pivotal axis of said rocking arm to adjust the height of said opening.

23. The reader device according to claim 21, wherein said bearing means for pivotally and vertically movably suspending includes biasing means for biasing against upward rotation of said rocking arm about said pivotal axis of said rocking arm.

24. The reader device according to claim 21, wherein said bearing means for pivotally and vertically movably suspending includes stop means to prevent downward rotation of said rocking arm around said pivotal axis of said rocking arm.

25. The reader device according to claim 21, wherein said bearing means for pivotally and vertically movably suspending includes stop means to prevent downward rotation of said rocking arm around said pivotal axis of said rocking arm.

26. The reader device according to claim 21, further including height adjustment means having biasing means to bias against rotation upward of said rocking arm about said pivotal axis of said rocking arm; stop means to prevent downward rotation of said rocking arm around said pivotal axis of said rocking arm past a certain point, and stop adjustment means for adjusting said certain point.

27. The reader device according to claim 26, wherein said transport means includes a first transport assembly and a second transport assembly, each said transport assembly having at least two belts operable to rotate in the direction of said travel path with the speed of said belts of said second transport assembly being greater than the speed of said belts of said first transport assembly; said blocking member being positioned over said first transport assembly; and said reading area being positioned on said second transport assembly.

28. The reader device according to claim 26, further including a lower envelope selector; said lower envelope selector being positioned on said transport means in traversing relationship with said travel path; and said lower envelope selector, relative to said travel path, being positioned in front of said bearing member.

29. The reader device according to claim 1, further including height adjustment means for raising or lowering the middle of said blocking member to adjust the height of said opening.

30. The reader device according to claim 1, wherein said bearing means for pivotally and vertically movably suspending includes biasing means for biasing against upward movement of the middle of said blocking member.

31. The reader device according to claim 1, wherein said bearing means for pivotally and vertically movably suspending includes stop means to prevent downward movement of the middle of said blocking member.

32. The reader device according to claim 1, further including height adjustment means having biasing means to bias against upward movement of the middle of said blocking member; stop means to prevent downward movement of the middle of said blocking member past a certain point; and stop adjustment means for changing said certain point.

33. The reader device according to claim 1, wherein said transport means includes a first transport assembly and a second transport assembly, each said transport assembly having at least two belts operable to rotate in the direction of said travel path with the speed of said belts of said second transport assembly being greater than the speed of said belts of said first transport assembly; said blocking member being positioned over said first transport assembly; and said reading area being positioned on said second transport assembly.

34. The reader device according to claim 33, wherein said first transport assembly has a downward incline relative to the horizontal and in the direction of said travel path; and the adjacent ends of said first and second transport assemblies are substantially at the same horizontal level.

35. The reader device according to claim 34, wherein said second transport assembly has an upward incline relative to the horizontal and in the direction of said travel path.

36. The reader device according to claim 1, further including a lower envelope selector; said lower envelope selector being positioned on said transport means in traversing relationship with said travel path; and said lower envelope selector, relative to said travel path, being positioned in front of said bearing member.

37. The reader device according to claim 36, wherein said lower envelope selector includes a guide roller and means for pressing said guide roller against said transport means.

38. The reader device according to claim 36, wherein said lower envelope selector includes a flexible curved plate.

39. The reader device according to claim 1, further including at least one roller pivotally mounted and disposed in pressing engagement against said transport means; and said at least one roller being further disposed in traversing relationship with said travel path and, relative to said travel path, being positioned behind of said bearing member.

40. A method of providing one document at a time to a barcode or scan reader device, the method including the steps of:
    transporting the documents along a travel path of a document transport system through a reading area;
    placing a blocking member over the top of the document transport system and before the reading area so as to leave an opening between the document transport system and the blocking member for allowing one document at a time to pass;
    rotatably suspending, for both pivotal and vertical and lateral displacement, said blocking member on a pivotal axis about said blocking member's mid section, said axis being generally in the same direction as said travel path;
    laterally moving said blocking member relative to said travel path; and
    allowing the blocking member to oscillate around its middle on said pivotal axis so as to allow passage of documents with non-uniform cross-sectional thickness and to move substantially vertically for passage of said non-uniform documents.

41. The method of claim 40, further including the step of stopping said opening from becoming smaller at the middle of the blocking member while one of said documents is passing.

42. The method of claim 41, further including the step of adjusting the minimum height of said opening prior to one of said documents passing.

43. The method of claim 40, further including the step of spring biasing the block member to allow upward vertical movement of the blocking member while one of the documents is passing.

44. A barcode or scan reader device for processing a plurality of documents, comprising:
    transport means for transporting said documents along a travel path through a reading area;
    a blocking member;
    bearing means, attached to said blocking member, for pivotally suspending and vertically movably suspending said blocking member along said travel path prior to said reading area; and
    said blocking member being disposed in spaced-apart relationship to said transport means so as to form an elongated opening between said transport means and said blocking member for passing said documents one at a time, said elongated opening being disposed in intersecting relationship with said travel path;
    wherein said blocking member has an elongated configuration traversing said travel path and said blocking member is rotatably suspended about its middle on a pivotal axis with said pivotal axis being disposed in the middle of said elongated configuration, said bearing means being pivotally attached to said blocking member at said pivotal axis;
    said transport means includes a first transport assembly and a second transport assembly, each said transport assembly having at least two belts operable to rotate in the direction of said travel path with the speed of said belts of said second transport assembly being greater than the speed of said belts of said first transport assembly; said blocking member being positioned over said first transport assembly; and said reading area being positioned on said second transport assembly.

45. The reader device according to claim 44, further including sliding means for slidingly mounting said bearing member for lateral movement relative to said travel path.

46. A barcode or scan reader device for processing a plurality of documents, comprising:
    transport means for transporting said documents along a travel path through a reading area; a blocking member;
    bearing means, attached to said blocking member, for pivotally suspending and vertically movably suspending said blocking member along said travel path prior to said reading area; and
    said blocking member being disposed in spaced-apart relationship to said transport means so as to form an elongated opening between said transport means and said blocking member for passing said documents one at a time, said elongated opening being disposed in intersecting relationship with said travel path;
    wherein said blocking member has an elongated configuration traversing said travel path and said blocking member is rotatably suspended about its middle on a pivotal axis with said pivotal axis being disposed in the middle of said elongated configuration, said bearing means being pivotally attached to said blocking member at said pivotal axis;
    said bearing means includes a rocking arm for pivotally suspending said blocking member, whereby movement of said documents along said travel path past said blocking member may be facilitated by oscillating motion of said blocking member; and
    said transport means includes a first transport assembly and a second transport assembly, each said transport assembly having at least two belts operable to rotate in the direction of said travel path with the speed of said belts of said second transport assembly being greater than the speed of said belts of said first transport assembly; said blocking member being positioned over said first transport assembly; and said reading area being positioned on said second transport assembly.

47. A barcode or scan reader device for processing a plurality of documents, comprising:
    transport means for transporting said documents along a travel path through a reading area;
    a blocking member;
    bearing means, attached to said blocking member, for pivotally suspending and vertically movably suspending said blocking member along said travel path prior to said reading area; and said blocking member being disposed in spaced-apart relationship to said transport means so as to form an elongated opening between said transport means and said blocking member for passing said documents one at a time, said elongated opening being disposed in intersecting relationship with said travel path;

wherein said blocking member has an elongated configuration traversing said travel path and said blocking member is rotatably suspended about its middle on a pivotal axis with said pivotal axis being disposed in the middle of said elongated configuration, said bearing means being pivotally attached to said blocking member at said pivotal axis; and, a lower envelope selector; said lower envelope selector being positioned on said transport means in traversing relationship with said travel path; and said lower envelope selector, relative to said travel path, being positioned in front of said bearing member.

* * * * *